US005136311A

United States Patent [19]

Hays

[11] Patent Number: 5,136,311

[45] Date of Patent: Aug. 4, 1992

[54] APERTURELESS DIRECT ELECTROSTATIC PRINTER

[75] Inventor: Dan A. Hays, Fairport, N.Y.

[73] Assignee: Xerox Corporation, Stamford, Conn.

[21] Appl. No.: 525,926

[22] Filed: May 21, 1990

[51] Int. Cl.[5] .......... G01D 15/06

[52] U.S. Cl. .......... 346/153.1; 346/160.1

[58] Field of Search .......... 346/153.1-159

[56] References Cited

U.S. PATENT DOCUMENTS

| | | | |
|---|---|---|---|
| 3,689,935 | 5/1972 | Pressman et al. | 346/74 |
| 4,454,520 | 6/1984 | Braschler et al. | 346/153.1 |
| 4,491,855 | 1/1985 | Fujii et al. | 346/159 |
| 4,568,955 | 2/1986 | Hosoya et al. | 346/153.1 |
| 4,641,955 | 2/1987 | Yuasa | 346/159 |
| 4,743,926 | 5/1988 | Schmidlin | 346/159 |
| 4,746,939 | 5/1988 | Kikuchi et al. | 346/153.1 |
| 4,755,837 | 5/1988 | Schmidlin | 346/155 |
| 4,814,796 | 3/1989 | Schmidlin | 346/155 |
| 4,860,036 | 8/1989 | Schmidlin | 346/159 |
| 4,876,561 | 10/1989 | Schmidlin | 346/159 |

*Primary Examiner*—George H. Miller, Jr.

[57] ABSTRACT

Direct electrostatic printing without the use of an apertured printhead structure is accomplished by supplying mechanical energy in an image-wise manner via AC fringe fields coupled to a toned donor member. The A.C. fringe fields are created using paired electrodes positioned behind the donor member where they can properly function notwithstanding fluctuations in the ambient environment.

16 Claims, 1 Drawing Sheet

APERTURELESS DIRECT ELECTROSTATIC PRINTER

BACKGROUND OF THE INVENTION

This invention relates to electrostatic printing devices and more particularly to nonimpact printing devices which utilize electronically addressable pringheads for depositing developer in image configuration on plain paper substrates.

Of the various electrostatic printing techniques, the most familiar and widely utilized is that of xerography wherein latent electrostatic images formed on a charge retentive surface are developed by a suitable toner material to render the images visible, the images being subsequently transferred to plain paper.

A lesser known form of electrostatic printing is one that has come to be known as direct electrostatic printing (DEP). This form of printing differs from the aforementioned xerographic form, in that, the toner or developing material is deposited directly onto a plain (i.e. not specially treated) substrate in image configuration. This type of printing device is disclosed in U.S. Pat. No. 3,689,935 issued Sep. 5, 1972 to Gerald L. Pressman et al. In general, this type of printing device uses electrostatic fields associated with addressable electrodes for allowing passage of developer material through selected apertures in a printhead structure. Additionally, electrostatic fields are used for attracting developer material to an imatging substrate in image configuration.

Pressman et al disclose an electrostatic line printer incorporating a multilayered particle modulator or printhead comprising a layer of insulating material, a contginuous layer of conducting material on one side of the insulating layer and a segmented layer of conducting material on one side of the insulating layer and a segmented layer of conducting material on the other side of the insulating layer. At least one row of apertures is formed through the multilayered particle modulator. Each segment of the segmented layer of the conductive material is formed around a portion of an aperture and is insulatively isolated from every other segment of the segmented conductive layer. Selected potentials are applied to each of the segments of the segmented conductive layer while a fixed potential is applied to the continuous conductive layer. An overall applied field projects charged particles through the row of apertures of the particle modulator and the density of the particle stream is modulated according to the pattern of potentials applied to the segments of the segmented conductive layer. The modulated stream of charged particles impinge upon a print-receiving medium interposed in the modulated particle stream and translated relative to the particle modulator to provide line-by-line scan printing. In the Pressman et al device the supply of the toner to the control member is not uniformly effected and irregularities are liable to occur in the image on the image receiving member. High-speed recording is difficult and moreover, the openings in the printhead are liable to be clogged by the toner.

U.S. Pat. No. 4,491,855 issued on Jan. 1, 1985 in the name of Fujii et al discloses a method and apparatus utilizing a controller having a plurality of openings or slit-like openings to control the passage of charged particles and to record a visible image of charged particles directly on an image receiving member. Specifically, disclosed therein is an improved device for supplying the charged particles to a control electrode that has allegedly made high-speed and stable recording possible. The improvement Fujii et al lies in that the charged particles are supported on a supporting member and an alternating electric field is applied between the supporting member and the control electrode. Fujii et al purports to obviate the problems noted above with respect to Pressman et al. Thus, Fujii et al alleges that their device makes it possible to sufficiently supply the charged particles to the control electrode without scattering them.

U.S. Pat. No. 4,568,955 issued on Feb. 4, 1986 to Hosoya et al discloses a recording apparatus wherein a visible image based on image information is formed on an ordinary sheet by a developer. The recording apparatus comprises a developing roller spaced at a predetermined distance from and facing the ordinary sheet and carrying the developer thereon. It further comprises a plurality of addressable recording electrodes and corresponding signal sources connected thereto for attracting the developer on the developing roller to the ordinary sheet by generating an electric field between the ordinary sheet and the developing roller according to the image information. A plurality of mutually insulated electrodes are provided on the developing roller and extend therefrom in one direction. A.C. and D.C. voltage sources are connected to the electrodes, for generating alternating electric fringe fields between adjacent ones of the electrodes to cause oscillations of the developer positioned between the adjacent electrodes along electric lines of force therebetween to thereby liberate the developer from the developing roller.

Direct electrostatic printing (DEP) structures are particularly attractive due to reduced manufacturing costs and increased reliability opportunities in nonimpact electronic printing. DEP printing systems which utilize apertured printhead structures such as those of Pressman et al and Fujii et al have the potential problem of reduced performance due to aperture clogging.

The problem of aperture clogging is addressed in a number of patents as follows:

U.S. Pat. No. 4,743,926 granted to Schmidlin et al on May 10, 1988 and assigned to the same assignee as the instant invention discloses an electrostatic printing apparatus including structure for delivering developer or toner particles to a printhead forming an integral part of the printing device. Alternatively, the toner particles can be delivered to a charge retentive surface containing latent images. The developer or toner delivery system is adapted to deliver toner containing a minimum quantity of wrong sign and size toner. To this end, the developer delivery system includes a pair of charged toner conveyors which are supported in face-to-face relation. A bias voltage is applied across the two conveyors to cause toner of one charge polarity to be attracted to one of the conveyors while toner of the opposite is attracted to the other conveyor. One of charged tonery conveyors delivers toner of the disired polarity to an apertured printhead where the toner is attracted to various apertures thereof from the conveyor.

In another embodiment of the '926 patent a single charged toner conveyor is supplied by a pair of three-phase generators which are biased by a DC source which causes toner of one polarity to travel in one direction on the electrode array while toner of the opposite polarity travels generally in the opposite direction.

In an additional embodiment disclosed in the '926 patent, a toner charging device is provided which charges uncharged toner particles to a level sufficient for movement by one or the other of the aforementioned charged toner conveyors.

U.S. Pat. No. 4,814,796 granted to Fred W. Schmidlin on Mar. 3, 1989 and assigned to the same assignee as the instant invention discloses a direct electrostatic printing apparatus including structure for delivering developer or toner particles to a printhead forming an integral part of the printing device. The printing device includes, in addition to the printhead, a conductive shoe which is suitably biased during a printing cycle to assist in the electrostatic attraction of developer through apertures in the printhead onto the copying medium disposed intermediate the printhead and the conductive shoe. The structure for delivering developer or toner is adapted to deliver toner containing a minimum quantity of wrong sign toner. To this end, the developer delivery system includes a conventional magnetic brush which delivers toner to a donor roll structure which, in turn, delivers toner to the vicinity of apertures in the printhead structure.

U.S. Pat. No. 4,860,036 granted to Fred W. Schmidlin Aug. 22, 1989 and assigned to the same assignee as the instant invention discloses a direct electrostatic printing apparatus including structure for delivering developer or toner particles to a printhead forming an integral part of the printing device. The printing device includes, in addition to an apertured printhead, a conductive shoe which is suitably biased during a printing cycle to assist in the electrostatic attraction of developer through apertures in the printhead onto the copying medium disposed intermediate the printhead and the conductive shoe. Developer or toner is delivered to the printhead via a pair of opposed charged toner or developer conveyors. One of the conveyers is attached to the printhead and has an opening therethrough for permitting passage of the developer or toner from between the conveyors to areas adjacent the apertures in the printhead.

U.S. Pat. No. 4,755,837 granted to Fred W. Schmidlin on Jul. 5, 1988 and assigned to the same assignee as the instant invention discloses a direct electrostatic printing apparatus including structure for removing wrong sign developer particles from a printhead forming an integral part of the printing device. The printing device includes, in addition to the printhead, a conductive shoe which is suitably biased during a printing cycle to assist in the electrostatic attraction of developer passing through apertures in the printhead onto the copying medium disposed intermediate the printhead and the conductive shoe. During a cleaning cycle, the printing bias is removed from the shoe and an electrical bias suitable for creating an oscillating electrostatic field which effects removal of toner from the printhead is applied to the shoe.

U.S. Pat. No. 4,876,561 granted to Fred W. Schmidlin on Oct. 24, 1989 discloses a direct electrostatic printing (DEP) device wherein printing is optimized by presenting well charged toner to a charged toner conveyor which conveys the toner to an apertured printhead structure for propulsion therethrough. The charged toner conveyor comprises a plurality of electrodes wherein the electrode density (i.e. over 100 electrodes per inch) is relatively large for enabling a high toner deleivery rate without risk of air breakdown. The printhead structure is constructed for minimization of aperture clogging. To this end the thickness of the printhead structure is about 0.025 mm and the aperture diameter (i.e. 0.15 mm) is large compared to the printhead thickness.

Circumventing the possibility of plugged channels in the apertures printheads makes the nonaperture systems such as that disclosed in Hosoya et al attractive. However, since the conductivity of plain paper varies considerable with relative humidity, the effectiveness of Hosoya et al' signal electrodes positioned behind plain paper for the purpose of controlling the image-wise deposition of toner can be degraded due to electrical shielding by the paper at high relative humidities.

BRIEF DESCRIPTION OF THE INVENTION

Briefly, the present invention provides a non-contact printing device in the form of Direct Electrostatic Printer which is not plagued by aperture clogging and which is well suited for use with a plain paper image receiver.

To this end, there is provided an apertureless Direct Electrostatic Printing system wherein image-wise toner deposition is controlled by time-dependent electric fringe fields emanating from electrode pairs positioned behind a donor toned with charged toner particles. The fringe-field electrodes are part of an array aligned perpendicular to the process direction. A high DC electric field is applied across a gap between the toned donor and a paper image receiver backde by a biased electrode to promote electrostatic transport of detached charged toner particles across the gap. In the absence of an AC fringe field acting on the toner, the particles are not detached by the DC gap field since the electrostatic force applied perpendicular to the donor cannot overcome the adhesive forces between the toner and the donor. However, when a time-dependent electrostatic force is applied to the charged particles by the fringe field from the electrodes behind the toned donor, the lateral force and torque acting on the particles will break the adhesive bonds and enable the normal electrostatic force to detach the particles for electrostatic deposition onto the paper in image configuration. Waveform optimization of the time-dependent fringe fields for the most effective electrical coupling of mechanical energy into the particles is derived in accordance with the physical properties of the printer components. When a bias is applied across the electrode pair, the toner particles are attracted to one electrode momentarily and then repelled when the polarity is reversed. The motion of the particle under the reverse polarity condition enables toner release from the donor in the presence of the DC gap field. Release is aided by particles sliding against the donor which would disrupt the adhesive bonds of the sliding and neighboring particles.

DETAILED DESCRIPTION OF THE DRAWINGS

Figure 1:
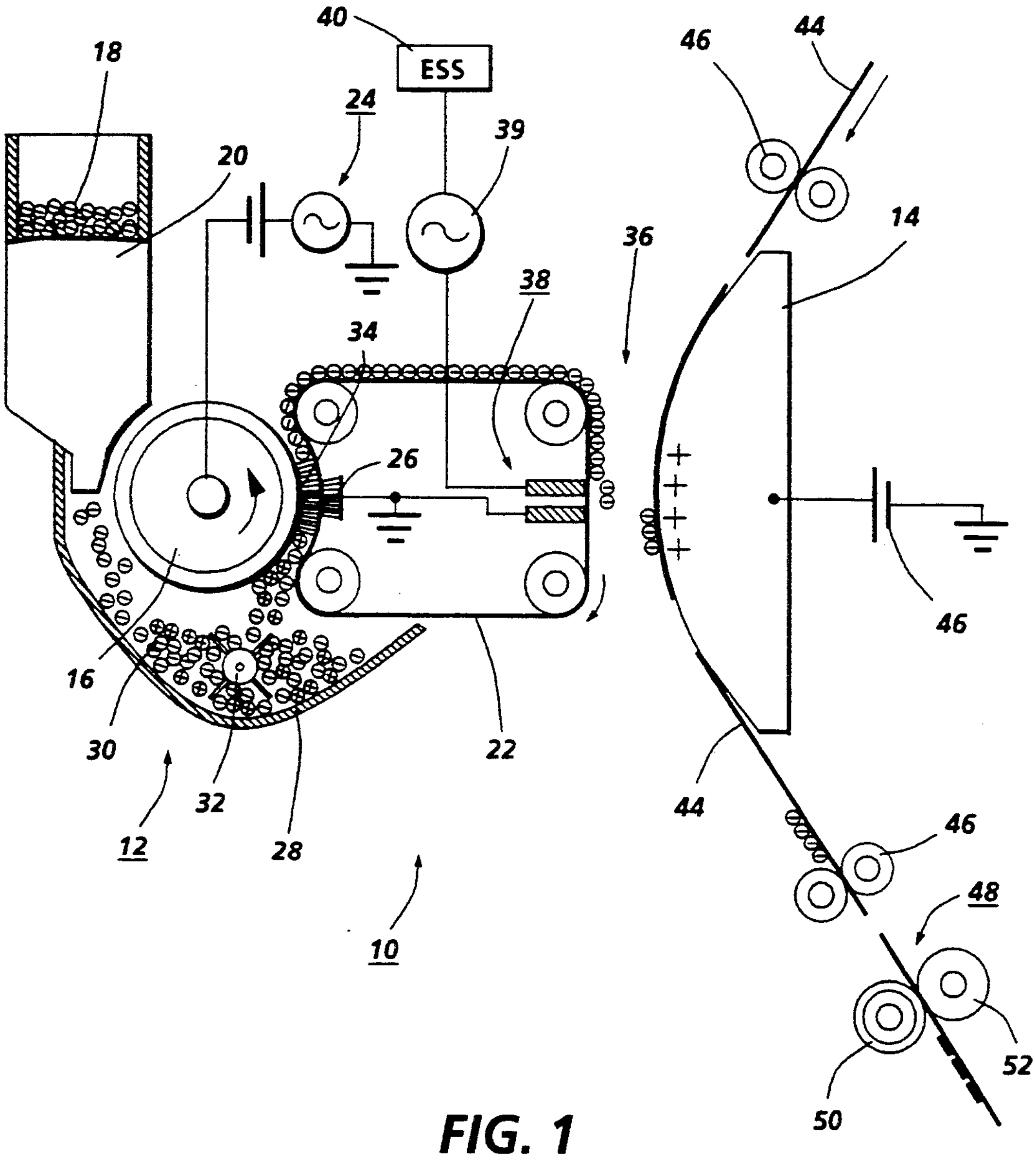
Figure 2:
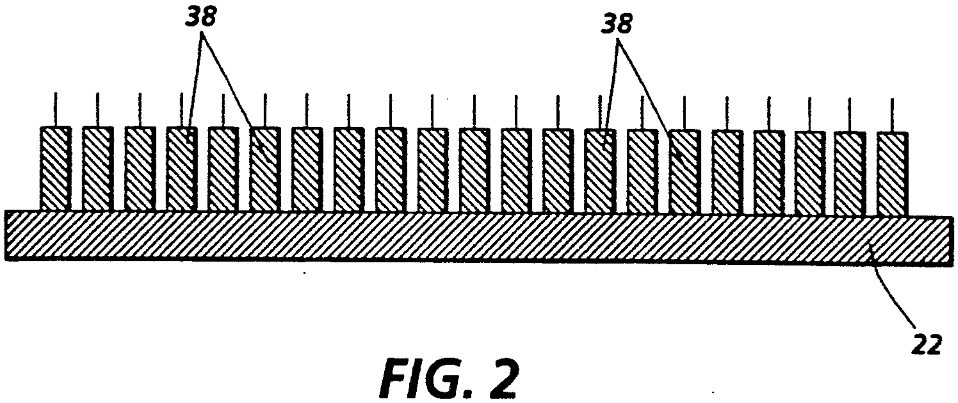

FIG. 1 is a schematic illustration of a printing apparatus incorporating the present invention; and FIG. 2 is a transverse view of a donor belt and linear array of toner liberating electrode structures for effecting detachment of toner from the donor belt.

DETAILED DESCRIPTION OF THE PREFERRED EMBODIMENT OF THE INVENTION

The printing apparatus 10 includes a developer delivery system generally indicated by reference character 12 and a backing electrode or shoe 14.

The developer delivery system 12 includes a magnetic brush 16 supported for counterclockwise rotation adjacent a supply of toner particles 18 dispensed from a hopper 20. A toner donor belt structure 22 is supported for clockwise movement adjacent the magnetic brush 6 for being toned (i.e. having toner deposited thereon) thereby. To this end, the magnetic brush as a DC bias of about −200 volts applied thereto via a DC and AC voltage source 24. A grounded conductive brush 26 contacts the inside of the belt 22 opposite the side contacted by the developer brush 16.

The donor belt 22 could also be toned with a single-component development system and/or be in the form of a rigid roll. The mechanical and electrical properties of the donor material are chosen to enhance the electric fringe field acting on the toner. The donor material has semiconducting properties such that the conductivity is sufficient to relax charge on the order of the belt cycle time (secs) but during the time on the order of the AC fringe-field period (msec), the material is insulating within the plane of the donor. Preferably, the donor belt is relatively thin. The donor belt structure may be fabricated of polyvinyl fluoride doped with carbon black.

On the other hand, enhanced fringe-fields created at the donor surface could be obtained if the donor conductivity is anisotropic and high in the direction perpendicular to the donor. A donor with such properties could be fabricated from materials containing channels such as Nuclepore® Membrane Filters manufactured by Nuclepore Corp. and Photoceram® manufactured by Corning Glass Works which are filled with conducting agents.

The charged toner particles 18 are dispensed into a developer housing 28 where they are mixed with carrier particles 30 by means of a paddle wheel 32. The toner is dispensed from the hopper 20 as it is depleted from the mixture of carrier and toner in the housing 28. Control of the toner dispensed from the housing may be accomplished in accordance with well known techniques in the art. A brush 34 containing carrier and toner particles is formed in the nip between the magnetic brush 16 and the belt 22 in accordance with well known principles inherent in magnetic brush development systems. The electrically biased magnetic brush 16 and the conductive brush 26 cooperate to effect the attraction of toner particles to the donor belt from the magnetic carrier particles to which the toner particles adhere.

Negatively charged toner particles are transported by the belt to a gap 36 intermediate the belt 22 and the backing electrode 14. The gap 36 is approximately 250 microns. A linear array of electrode pairs 38 is positioned behind the belt 22 for effecting detachment of toner from the belt 22 in the area of the gap 36. To this end, an AC voltage of about 300 volts peak provided by source 39 is selectively applied to individual electrode pairs 38 in accordance with information received in the form of electrical signals from an Electronic Subsystem (ESS) 40.

Image-wise toner detachment is controlled by time-dependent electric fringe fields emanating from electrode pairs positioned behind the donor belt 22 toned with charged toner particles. The fringe-field electrodes are part of the linear array and are aligned perpendicular to the process direction. When a time-dependent electrostatic force is applied to the charged particles by the fringe field from selected electrodes behind the toned donor, the lateral force and torque acting on the particles will break the adhesive bonds and enable normal electrostatic forces extending across the gap to attract the particles for electrostatic deposition onto the paper in image configuration. Waveform optimizaton of the timedependent fringe fields for the most effective electrical coupling of mechanical energy into the particles is derived in accordance with the physical properties of the printer components. When an AC bias is applied across an electrode pair, the toner particles are attracted to one electrode momentarily and then repelled when the polarity is reversed. The motion of the particle under the reverse condition enables toner release from the donor in the presence of the DC gap field. Release is aided by particles sliding against the donor which would disrupt the adhesive bonds of the sliding and neighboring particles.

The donor belt 22 is entrained about a plurality of idler rollers and a roller driven by a motor, not shown, for imparting movement thereto. A suitable toner removal member, not shown, removes toner from the belt to be returned to the hopper 28.

The developer preferably comprises any suitable insulative nonmagnetic toner/conductive carrier combination having Aerosil (Trademark of Degussa, Inc.) contained therein in an amount equal to ½% by weight and also having zinc stearate contained therein in an amount equal to 3% by weight.

Image receiver material in the form of cut sheets 44 of plain paper are fed from a supply tray, not shown. The sheets 44 are transported in contact with the backing electrode or shoe 14 via edge transport roll pairs 46. A positive voltage in the order of 100 to 500 volts is applied to the electrode or shoe 14 via a DC source 46. Thus, a DC field is established across the gap 36 for attracting the toner particles detached from the donor belt 22 to the imaging sheets 44.

At the fusing station, a fuser assembly, indicated generally by the reference numeral 48, permanently affixes the toner powder images to sheets 44. Preferably, fuser assembly 48 includes a heated fuser roller 50 adapted to be pressure engaged with a back-up roller 52 with the toner powder images contacting fuser roller 52. In this manner, the toner powder image is permanently affixed to copy substrate 44. After fusing, a chute, not shown, guides the advancing sheet 44 to catch tray (not shown) for removal form the printing machine by the operator.

To summarize, the Direct Electrostatic Printing disclosed herein is based on a recognition that charged toner on a donor is not easily detached by an applied electric field (limited by air breakdown) unless the adhesion is reduced by the supply of additional mechanical energy. If the mechanical energy is supplied in an image-wise manner via AC fringe electic field coupling to a toned donor, direct electrostatic printing onto paper is achieved without an aperture plate.

What is claimed is:

1. An apertureless direct electrostatic printing apparatus for forming toner images on a plain paper image receiving member, said apparatus comprising:

a supply of toner;

a donor belt having opposed surfaces for conveying toner on one of said opposed surfaces from said supply to a location remote from said supply;

means for moving said plain paper image receiving member proximate said remote location;

a plurality of electrode pairs positioned adjacent the other of said opposed surfaces;

means for selectively applying an AC voltage to said plurality of electrode pairs for detaching toner from said donor member in image configuration; and means for effecting attraction of toner detached from said donor member in image configuration to said plain paper image receiving member.

2. Apparatus according to claim 1 wherein said donor member and said image receiving member are space apart about 250 microns.

3. Apparatus according to claim 2 wherein said supply of toner comprises a two component developer and a magnetic brush.

4. Apparatus according to claim 3 wherein a positve DC voltage of approximately 200 volts is applied between said magnetic brush and a backing electrode for effecting transfer of toner to said belt donor from said supply.

5. Apparatus, according to claim 4 including a backing electrode positioned behind said image receiving member, said electrode having a negative DC voltage in the order of 100 to 500 volts applied thereto.

6. Apparatus according to claim 3 wherein a negative DC voltage of approximately 200 volts is applied between said magnetic brush and a backing electrode for effecting transfer of toner to said belt donor from said supply.

7. Apparatus accordilng to claim 6 wherein said AC voltage is approximately 300 volts peak.

8. Apparatus according to claim 7 including a backing electrode positioned behind said image receiving member, said electrode having a positive DC voltage in the order of 100 to 500 volts applied thereto.

9. The method of forming toner images on a plain paper image receiving member, said method including the steps of:

providing a supply of toner;

using a donor belt having opposed surfaces with toner carried by one of said opposed surfaces, conveying toner from said supply to a location remote from said supply;

moving a plain paper image receiving member proximate said remote location;

selectively applying AC voltages to a plurality of electrode pairs positioned adjacent the other of said opposed surfaces for effecting detachment of toner from said donor member in image configuration; and effecting attraction of toner detached from said donor member in image configuration to said plain image receiving member.

10. The method according to claim 9 wherein said donor member and said image receiving member are spaced apart about 250 microns.

11. The method according to claim 10 wherein said supply of toner comprises a two component developer and a magnetic brush.

12. The method according to claim 11 wherein a positive DC voltage of approximately 200 volts is applied between said magnetic brush and a backing electrode for effecting transfer of toner to said belt donor from said supply.

13. The method according to claim 12 including a backing electrode positioned behind said image receiving member, said electrode having a negative DC voltage in the order of 100 to 500 volts applied thereto.

14. The method according to claim 11 wherein a negative DC voltage of approximately 200 volts is applied between said magnetic brush and a backing electrode for effecting transfer of toner to said belt donor from said supply.

15. The method according to claim 14 wherein said AC voltage is approximately 300 volts peak voltage.

16. The method according to claim 15 including a backing electrode positioned behind said image receiving member, said electrode having a positive DC voltage in the order of 100 to 500 volts applied thereto.

* * * * *